United States Patent [19]

Hawkins et al.

[11] Patent Number: 4,784,403

[45] Date of Patent: * Nov. 15, 1988

[54] ANTI-JACKKNIFING APPARATUS

[75] Inventors: Wallace H. Hawkins, Greenville; Calvin B. Gosnell, Travelers Rest, both of S.C.

[73] Assignee: Red Arrow International, Inc., S.C.

[*] Notice: The portion of the term of this patent subsequent to Oct. 20, 2004 has been disclaimed.

[21] Appl. No.: 922,439

[22] Filed: Oct. 23, 1986

Related U.S. Application Data

[63] Continuation of Ser. No. 758,677, Jul. 25, 1985, abandoned.

[51] Int. Cl.$^4$ .............................................. B62D 53/06
[52] U.S. Cl. .................................. 280/432; 280/446 B
[58] Field of Search ............... 280/432, 446 B, 415 B, 280/423 R, 474

[56] References Cited

U.S. PATENT DOCUMENTS

| | | | |
|---|---|---|---|
| 3,063,739 | 11/1962 | Davies | 280/432 X |
| 3,328,051 | 6/1967 | Hope et al. | 280/432 |
| 3,439,936 | 4/1969 | Hines | 280/432 |
| 3,517,946 | 6/1970 | Rumsey et al. | 280/432 |
| 3,667,778 | 6/1972 | Hope et al. | 280/432 |
| 3,837,678 | 9/1974 | Cicero | 280/432 |
| 3,972,542 | 8/1976 | Dirks et al. | 280/432 |
| 4,068,860 | 1/1978 | Meyers et al. | 280/432 |
| 4,585,248 | 4/1986 | Miller et al. | 280/432 |

Primary Examiner—John J. Love
Assistant Examiner—Charles R. Watts
Attorney, Agent, or Firm—Lynn L. Augspurger

[57] ABSTRACT

Apparatus is disclosed for limiting the angular movement between the tractor and trailer wherein a fluid operated cylinder is mounted within a rigid frame, having a mounting bar attached to a forward member of the tractor, for moving an abutment means between a position extending downwardly within the longitudinal slot of the fifth wheel to a position wherein the abutment means is removed from the slot. Means are carried within the frame having fixed relation thereto for providing lateral support within the position of the slot.

10 Claims, 4 Drawing Sheets

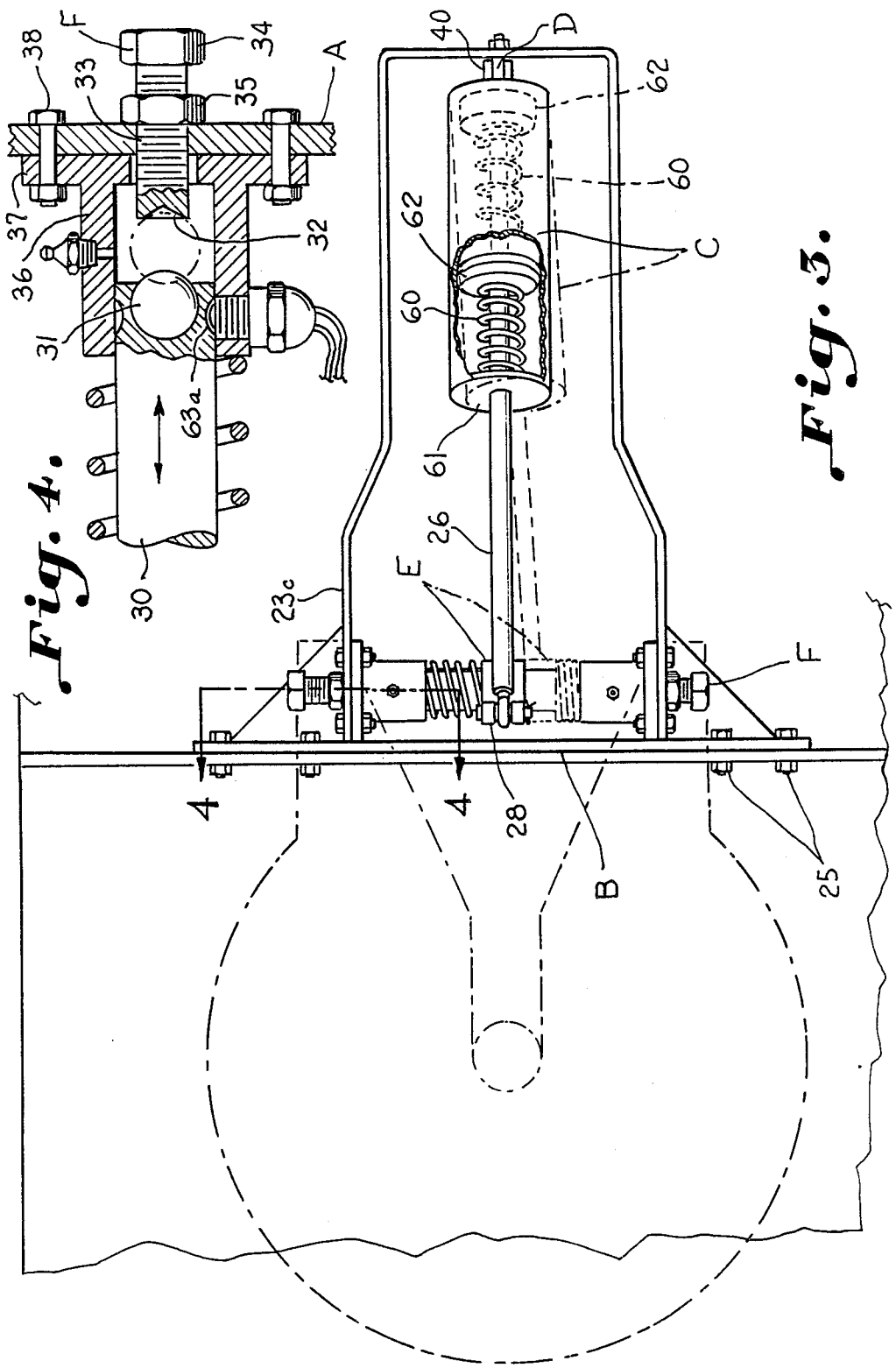

ANTI-JACKKNIFING APPARATUS

Background of the Invention

This is a continuation of copending application Ser. No. 758,677, filed July 25, 1985, now abandoned.

Anti-jacknifing apparatus has been provided in many configurations. U.S. Pat. Nos. 2,962,301, 3,837,678 and 3,972,542 illustrate the use of a fluid operated cylinder for moving an abutment means between a position within the longitudinal slot in the fifth wheel and a position remote from the slot. Such devices, however, provide limited maneuverability to make turns such as are required on mountainous roads or when maneuvering within the truck docking area. A major problem is making it possible to remove the abutment means from the slot when it is desired to do so. In devices of the type having cylinder operating abutment means, binding between the parts makes it impossible to withdraw the abutment means, and due to the mounting of the cylinder limited support is provided so that the cylinder becomes readily dislodged and the apparatus consequently becomes inoperable.

Accordingly, it is an important object of the invention to provide a sturdy mounting for the cylinder and movable parts affording support therefor during operation while facilitating withdrawal from the fifth wheel when such becomes necessary.

Another important object of the invention is the provision of a mounting for an abutment means within the slot of the fifth wheel in such a way that the angular disposition between the tractor and the trailer when the abutment means engage the sides of the slot may be adjusted to accommodate the terrain over which the tractor is to travel.

SUMMARY OF THE INVENTION

It has been found that a device affording abutment means operated by a cylinder may be constructed so as to be withdrawn from the longitudinal slot in the fifth wheel by providing a rigid rectangular frame having a mounting bar across the front for supporting the cylinder within the frame as well as affording a slide for the abutment means which is fixed to the frame so as to provide lateral support for the abutment means when such becomes engaged while preventing jackknifing.

It has been found possible to provide for lateral displacement of the abutment means to an extent which may be adjustable so that the angular disposition between the tractor and trailer when preventing jackknifing may be adjusted.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a plan view looking upwardly beneath the fifth wheel toward the trailer illustrating the anti-jackknifing mechanism in operable position, FIG. 4 is a sectional elevation taken on the line 4—4 in FIG. 3.

DESCRIPTION OF A PREFERRED EMBODIMENT

Figure 1:
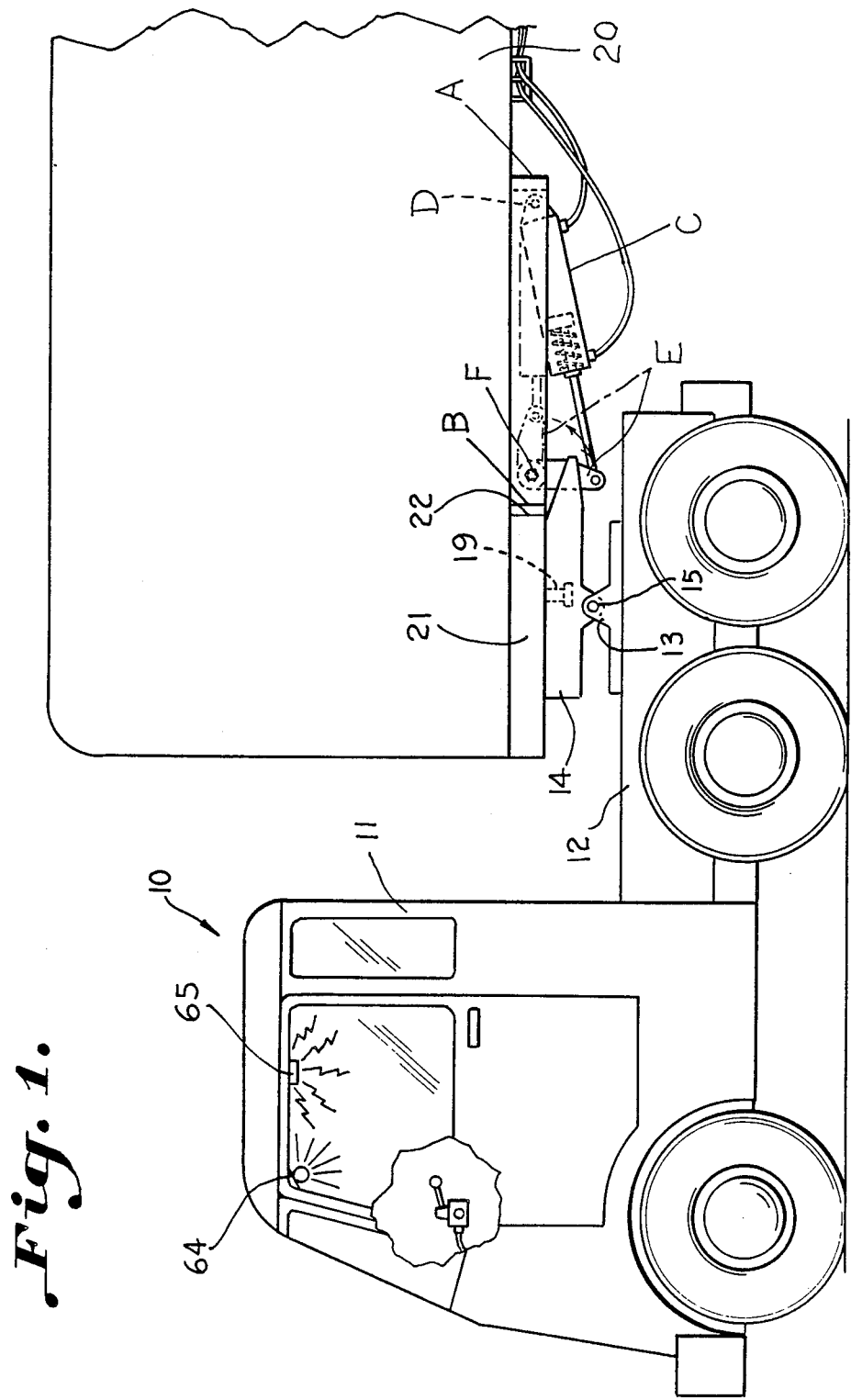
FIG. 1 is a side elevation illustrating an anti-jackknifing apparatus constructed in accordance with the invention.
Figure 2:
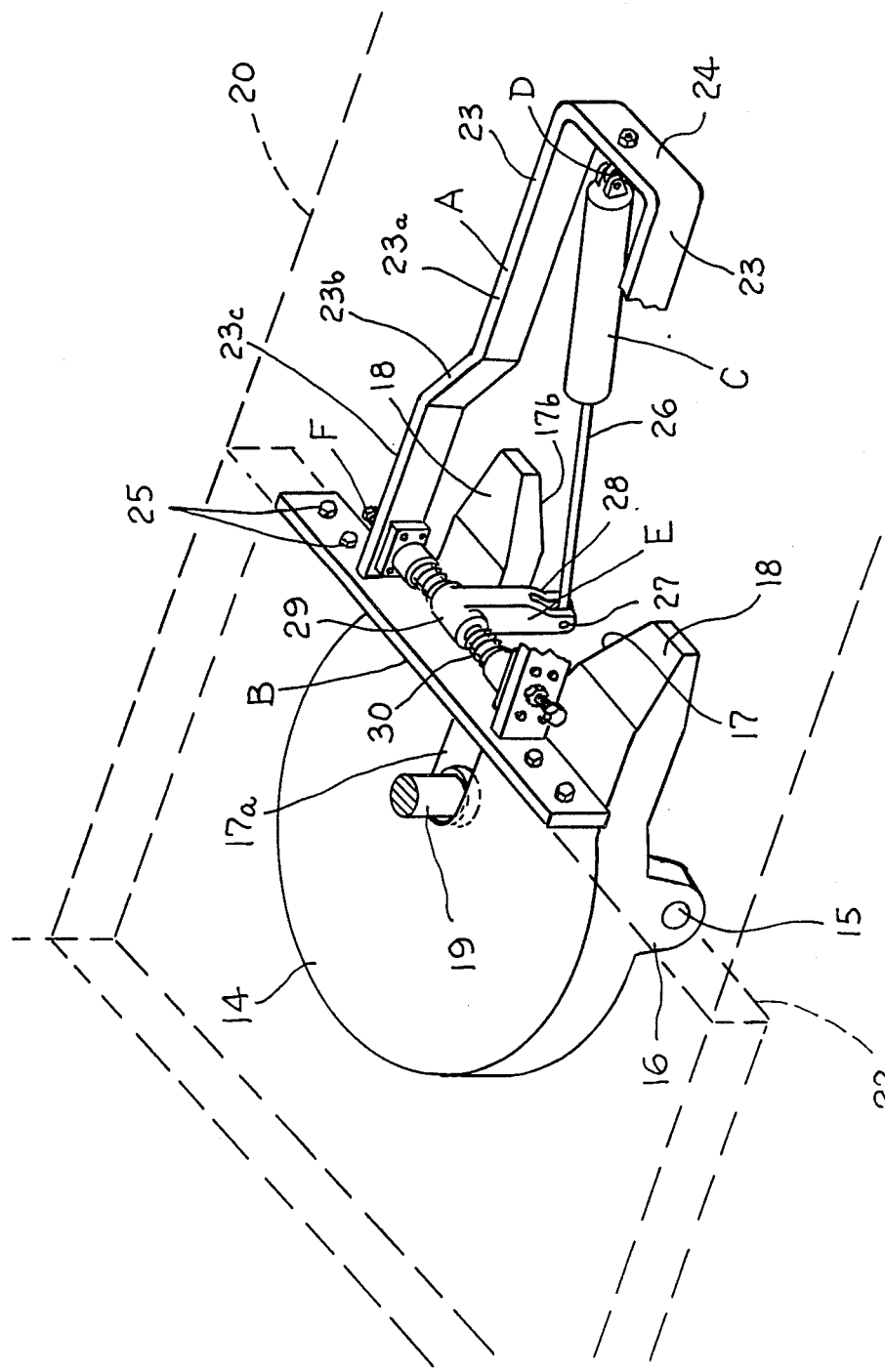
FIG. 2 is a perspective view looking downwardly from the trailer illustrating the anti-jackknifing abutment means depressed within the fifth wheel slot between ear portions.

The drawings illustrate an anti-jackknifing apparatus for use on a tractor trailer including a fifth wheel with a longitudinal slot having a tapered diverging opening defining spaced ear portions extending rearwardly of the tractor. A substantially rectangular longitudinal frame A has a transverse mounting bar B secured adjacent a forward end thereof for securement to a forward portion of the trailer in superposed relation to the slot. A fluid operated cylinder C has an extensible member projecting forwardly from one end thereof. Means D secure the fluid operated cylinder within the frame. Abutment means E are carried within a forward portion of the frame connected to the cylinder for movement between a first position extending downwardly within the slot and a second position wherein the abutment means are removed from the slot. Means F are carried within the frame having fixed relation thereto providing lateral support for the abutment means when in the first position. Thus, the cylinder and the abutment means are supported within the frame so as to avoid damage thereto when the abutment means is in the first position locking the tractor and trailer against relative angular movement to avoid jackknifing.

The drawings illustrate a tractor broadly disignated at 10 having a cab 11 and a bed 12 carrying the usual mounting 13 upon with a fifth wheel 14 is pivoted as at 15 to a depending portion 16. The fifth wheel 14 has a slot 17 therein which has a relatively straight longitudinal portion 17a and a diverging portion 17b which defines ear portions 18. The slot 17 is provided to accommodate the king pin 19 carried by the trailer 20. The trailer 20 has a forward frame member 21 having a rear surface 22 which serves as a mounting for the anti-jackknifing apparatus constructed in accordance with the invention. The king pin 19 is carried by the forward frame member 21.

The rectangular frame portion A includes side members 23 which extend from a transverse rear end portion 24. The sides 23 have rear portions 23a and outwardly flaring portions 23b as well as forward aligned portions 23c. The frame also includes a transverse bar or frame portion B which bridges the ends of the frame members 23c. The bar has suitable bolts 25 passing therethrough for securing the apparatus hereof to the forward frame portion of the trailer at the surface 22.

The fluid operated cylinder C has an attachment means D for pivotally securing the cylinder to the transverse frame member 24. The cylinder has a piston rod or other extensible member 26 pivotally connected as at 27 to a vertical abutment E. The abutment E has a bifurcated end portion 28 for attachment to the piston rod 26 and a collar 29 for fixed mounting upon a transverse member 30. The transverse member 30 is illustrated in FIG. 4 as having a ball member 31 carried adjacent an end and such may be received within an arcuately indented portion 32 of a threaded member 33. The threaded member 33 has a head portion 34 and is provided with a lock nut 35.

The assembly including the head 34 constitutes adjustable means F for providing lateral support for the abutment when it is in the slot 17 to serve its anti-jackknifing function. The transverse movable member 30 carrying the ball 31 is mounted within a housing 36 which has a bracket 37 at one end for securement to an internally threaded member 38. The member 38 serves to mount the adjustable threaded member 33 on the frame. In operation, the connection C is preferably a swivel connection with the bifurcated member 40 where as the bifurcated member 28 serves as a swivel connection to the piston rod 26.

It will be observed that the cylinder C and the abutment E carried thereby are movable from side to side as illustrated in broken lines in FIG. 3 so as to provide lateral support for the abutment in positions which are adjustable to vary the angular relationship between the tractor and trailer. The adjustable means F including the bracket 37 are secured as by bolts 38 to the frame member A at the forward aligned side members 23c.

Figure 5:
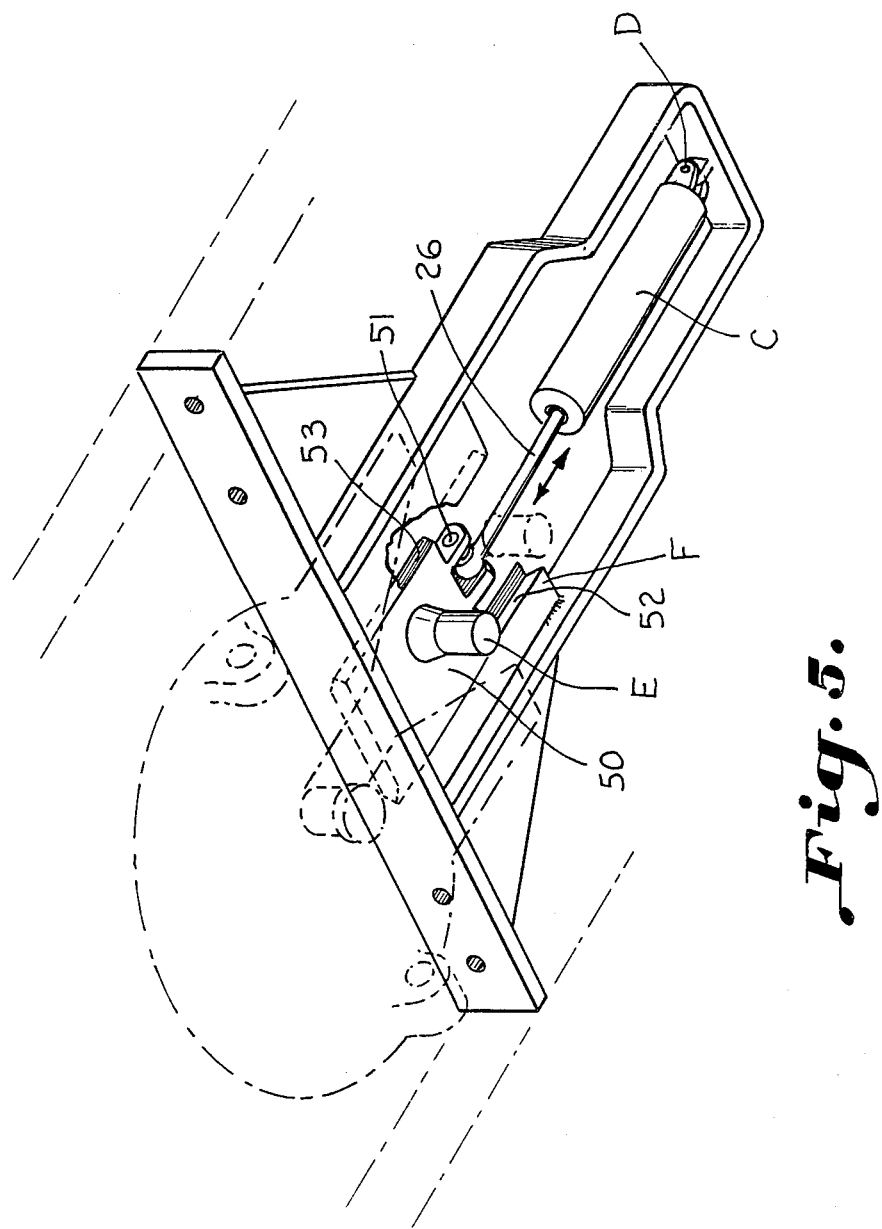
FIG. 5 is a perspective view of an anti-jackknifing apparatus constructed in accordance with a modified form of the invention.

FIG. 5 illustrates a modified form of the invention wherein the cylinder C is secured at all times in alignment with the frame and carries a slide 50 which is pivotally connected as at 51 to the forward end of the extensible member 26. The slide 50 is provided with anti-friction means to assure ease of movement within a V-shaped groove 52 which is complementary to the V-shaped sides 53 of the slide. Thus arrangement assures lateral support for the abutment E which projects downwardly from the slide 50.

The spring means 60 (FIG. 3) moves the abutment from the first to the second position should fluid pressure in the cylinder fail.

The spring means is preferably carried within the cylinder for closing the extensible means in the event of fluid pressure failure. For this purpose the compression spring 60 is carried on the piston rod 26 between the cylinder head 61 and the abutment 62.

A switch including contacts 63 and 63a is activated as a result of movement of the respective member 30 when the abutment is about to engage the fifth wheel to avoid jackknifing, operating alarm means, including a light 64 and a buzzer or siren 65 located in the cab. In order to maintain the slide in central or neutral position and out of operation compression springs 66 are provided on the movable members 30 between the abutment and respective housings 36.

While a preferred embodiment of the invention has been described using specific terms, such description is for illustrative purposes only, and it is to be understood that changes and variations may be made without departing from the spirit or scope of the following claims.

What is claimed is:

1. Anti-jackknifing apparatus for use in connection between articulated vehicles having a pulling unit and trailer wherein there is mounted on the pulling unit a plate having a v-slot and in the v-slot of the plate a coupling is made with a trailer coupling pin, wherein the apparatus comprises, a support frame adapted to be mounted on said trailer,
an abutment member adapted to be positioned in an active engagement position between the sides of the v-slot of the pulling unit,
and drive means for said abutment member to move said abutment member into its active engagement position and retract it from said active engagement position,
said support frame including an abutment transverse support means including a mounting bar element mounted on the trailer above the v-slot of the pulling unit and behind the trailer coupling pin and positioning said abutment member which depends from the support frame in a depending vertically aligned position from above said v-slot and into the zone between the v-slot plate mounted on the pulling unit, said transverse support means and said drive means restraining movement of the abutment such that when pivotal movement of the pulling unit and trailer moves the abutment member and v-slot plate relative to each other to cause engagement of the abutment member with the v-slot side of the v-slot plate such engagement arrests further relative swinging movement of the pulling unit and trailer,
bracing means connected to said abutment transverse support means for transferring forces applied to said abutment member by and during engagement with said v-slot plate to said mounting bar element to thereby transfer the forces from said support frame to the trailer at a point above the v-slot.

2. An apparatus according to claim 1 wherein said bracing means includes bracing plates and housing for said abutment support means which are joined to said mounting bar element adapted to be joined to the trailer when the apparatus is mounted on said trailer.

3. An apparatus according to claim 2 wherein said abutment member is supported on a slide plate which slides in a channel of said abutment transverse support means as said abutment member is carried forwardly into a position for engagement with said v-slot plate.

4. An apparatus according to claim 1 wherein said mounting bar element is joined to said support frame which is adapted to be joined to the trailer, and said abutment transverse support members includes two transverse support members joined to the said mounting bar element, one at each side of the abutment member, to receive and transfer forces applied to said abutment member by its engagement with said v-slot plate to said mounting bar support frame, said two transverse support members fixing the normal active position of said abutment member a spaced distance from said mounting bar support frame member at a position where the abutment member in its normal active position has a member which is positioned to engage the v-slot plate.

5. An apparatus according to claim 1 wherein said abutment transverse support means includes means permitting said abutment member to pivot in a vertical direction down into position for engagement with said v-slot plate from a retracted position above said v-slot plate.

6. An apparatus according to claim 1 wherein said abutment transverse support means includes means permitting said abutment member to slide forwardly into a position for engagement with said v-slot plate from a retracted position rearward of said v-slot plate.

7. An anti-jackknifing apparatus for use in connection with a coupling of a tractor having a fifth wheel with a longitudinal outwardly tapering slot therein and a trailer having a frame thereunder, comprising:

elongated abutment means having a limit element pivotally movable in a vertical plane for movement between a first position where said limit element is adapted to extend when mounted on said trailer into an intercept zone located beneath said abutment means to a first position located within said tapering slot and a second position retracted from within said slot;

a transverse shaft member mounting said abutment for pivotal movement into and out of said intercept zone, said shaft member being supported by said frame beneath the trailer, actuation means for pivoting said abutment element between said first and second positions, and said limit element of said abutment means when stopped in position in said slot arresting relative rotational movement of said tractor and trailer about said coupling.

8. An anti-jackknifing apparatus as set forth in claim 7 including means mounting said abutment to permit limited transverse movement thereof with additional swinging movement of said tractor and trailer after engagement between the abutment and the fifth wheel.

9. An anti-jackknifing apparatus as set forth in claim 8 including a support frame adapted to be mounted on said trailer frame, said support frame having a mounting bar for securement to said trailer frame above said tapering slot.

10. An anti-jackknifing apparatus as set forth in claim 7 wherein said actuation means includes a fluid operated cylinder, and a support frame carrying said fluid operated cylinder about said tapering slot for vertical and lateral pivotal movement.

* * * * *